United States Patent
Liu et al.

(10) Patent No.: US 9,756,240 B2
(45) Date of Patent: Sep. 5, 2017

(54) WIDE-ANGLE LENS CALIBRATION SYSTEM AND METHOD THEREOF

(71) Applicant: INDUSTRIAL TECHNOLOGY RESEARCH INSTITUTE, Hsin-Chu (TW)

(72) Inventors: Wei-Cheng Liu, Zhubei (TW); Yu-Chung Chen, Miaoli County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 24 days.

(21) Appl. No.: 14/985,078

(22) Filed: Dec. 30, 2015

(65) Prior Publication Data
US 2017/0171464 A1    Jun. 15, 2017

(30) Foreign Application Priority Data
Dec. 11, 2015    (TW) .............................. 104141789 A

(51) Int. Cl.
*H04N 5/232*    (2006.01)
*H04N 5/225*    (2006.01)
(Continued)

(52) U.S. Cl.
CPC ........... *H04N 5/23229* (2013.01); *G06K 9/52* (2013.01); *G06T 7/0028* (2013.01);
(Continued)

(58) Field of Classification Search
CPC .... H04N 5/23229; H04N 5/2254; H04N 9/79; G06K 9/52; G06T 7/0028; G06T 7/0042
See application file for complete search history.

(56) References Cited

U.S. PATENT DOCUMENTS 7,889,234 B2    2/2011    Williams et al.
8,619,248 B2    12/2013    Bassi et al.
(Continued)

FOREIGN PATENT DOCUMENTS

CN    102111545 A    6/2011
CN    102682431 A    9/2012
(Continued)

OTHER PUBLICATIONS

Zhengyou Zhang, A flexible new technique for camera calibration, IEEE Transactions on Pattern Analysis and Machine Intelligence, 2000, 1330-1334, vol. 22, No. 11.
(Continued)

*Primary Examiner* — Abdelaaziz Tissire
(74) *Attorney, Agent, or Firm* — Locke Lord LLP; Tim Tingkang Xia, Esq.

(57) ABSTRACT

A wide-angle lens calibration system is provided, which may include a rotation unit, an image input unit, and a processing unit. A lens to be calibrated may be disposed on the rotation unit; the rotation direction of the rotation unit may be parallel to the horizontal direction; the optical axis center of the lens may be aligned with a reference object. The image input unit may receive images from the lens. The processing unit may control the rotation unit to rotate and analysis the images received from the lens. The processing unit may execute a distortion calibration process, wherein the processing unit may continuously rotate the rotation unit by a predetermined angle and then record the distance between the position of the reference object in the image and the optical axis center and a total rotation angle after each rotation so as to establish a distortion calibration model.

14 Claims, 7 Drawing Sheets

(51) Int. Cl.
  *G06T 7/00* (2017.01)
  *H04N 9/79* (2006.01)
  *G06K 9/52* (2006.01)
  *G06T 7/60* (2017.01)

(52) U.S. Cl.
  CPC .............. *G06T 7/0042* (2013.01); *G06T 7/60* (2013.01); *H04N 5/2254* (2013.01); *H04N 9/79* (2013.01); *H04N 2201/0001* (2013.01)

(56) References Cited

U.S. PATENT DOCUMENTS

| | | | | |
|---|---|---|---|---|
| 2002/0122584 | A1* | 9/2002 | Sugawara | G06K 9/3275 382/151 |
| 2003/0227562 | A1* | 12/2003 | Gouch | H04N 3/1587 348/345 |
| 2005/0104999 | A1* | 5/2005 | Wada | H04N 13/0239 348/373 |
| 2007/0104353 | A1* | 5/2007 | Vogel | G01C 1/04 382/106 |
| 2009/0010630 | A1* | 1/2009 | Higashibara | B60R 1/00 396/50 |
| 2009/0180008 | A1* | 7/2009 | Williams | G06T 7/80 348/241 |
| 2010/0053630 | A1* | 3/2010 | Oota | G01B 11/2441 356/450 |
| 2010/0194932 | A1 | 8/2010 | Mitsuya et al. | |
| 2011/0026014 | A1* | 2/2011 | Mack | G03B 13/22 356/124 |
| 2012/0002058 | A1* | 1/2012 | Ning | H04N 5/217 348/188 |
| 2014/0300754 | A1* | 10/2014 | Hsieh | H04N 17/002 348/187 |
| 2014/0375845 | A1* | 12/2014 | Lee | G06T 5/006 348/241 |
| 2015/0042851 | A1* | 2/2015 | Ma | H04N 5/2258 348/262 |
| 2016/0132748 | A1* | 5/2016 | Tillotson | G06K 9/4652 348/222.1 |

FOREIGN PATENT DOCUMENTS

| | | |
|---|---|---|
| CN | 103829917 A | 6/2014 |
| CN | 104036496 A | 9/2014 |
| TW | 201017222 A | 5/2010 |
| TW | 201019715 A | 5/2010 |
| TW | I423659 B | 1/2014 |
| TW | 201423146 A | 6/2014 |
| TW | 201507463 A | 2/2015 |
| WO | 2012165203 A1 | 12/2012 |

OTHER PUBLICATIONS

Duane C. Brown, Close Range Camera Calibration, Photogrammetric Engineering, 1971, 855-866.

G. P. Stein, Lens Distortion Calibration Using Point Correspondences, IEEE Computer Society Conference on Computer Vision and Pattern Recognition, 1996.

Jorge J. Moré, Levenberg-marquardt algorithm: Implementation and theory, Proceedings of the Biennial Conference Held at Dundee, 1977.

Shawn Becker et al., Semi-Automatic 3-D Model Extraction from Uncalibrated 2-D Camera Views, In Proc. of the SPIE Symposium on Electronic Imaging, 1995.

Frédéric Devernay et al., Straight lines have to be straight, Machine Vision and Applications, 2001, 14-24, vol. 13, No. 1.

Intellectual Property Office, Ministry of Economic Affairs, R. O. C, "Office Action", dated Nov. 29, 2016, Taiwan.

* cited by examiner

WIDE-ANGLE LENS CALIBRATION SYSTEM AND METHOD THEREOF

CROSS REFERENCE TO RELATED APPLICATION

All related applications are incorporated by reference. The present application is based on, and claims priority from, Taiwan Application Serial Number 104141789, filed on Dec. 11, 2015, the disclosure of which is hereby incorporated by reference herein in its entirety.

TECHNICAL FIELD

The technical field relates to a lens calibration system, in particular to a wide-angle lens calibration system. The technical field further related to the calibration method of the wide-angle lens calibration system.

BACKGROUND

The shooting range of a wide-angle lens is larger than a common lens; thus, the wide-angle lens can shoot images by wider angle of view; as having large angle of view, the wide-angle lens is comprehensively applied to monitoring system or vehicle-mounted image capturing device. Currently, the demand of the wide-angle lens also keeps increasing.

However, due to the design of the wide-angle lens, the object in the image captured by the wide-angle lens may be seriously distorted; further, the geometric shape of the object in the image captured by the wide-angle lens may be incorrect due to the design of the photosensitive element of the wide-angle lens; for the above reasons, the wide-angel lens cannot correctly show the real appearance of the object in the captured image; unfortunately, the conventional field of view calibration method cannot effectively solve the above problems.

SUMMARY

A wide-angle lens calibration system is provided, which may include a rotation unit, an image input unit and a processing unit. The rotation unit may mount a lens to be calibrated; the rotation direction of the rotation unit may be parallel to the horizontal direction, and the optical axis center of the lens may be aligned with a reference object. The image input unit may receive the images from the lens. The processing unit may control the rotation unit to rotate and analyze the images. The processing unit may execute a distortion calibration process to continuously rotate the rotation unit by a predetermined angle and record the distance between the position of the reference object in the image and the optical axis center, and the total rotation angle after each rotation so as to establish a distortion calibration model.

A wide-angle lens calibration method is provided, which may include the following steps: providing a reference object; aligning the optical axis center of a lens to be calibrated with the reference object; continuously rotate the lens by a first predetermined angle and along a rotation direction parallel to the horizontal direction; and recording the distance between the position of the reference object in the image received from the lens and the optical axis center and the total rotation angle after each rotation so as to establish a distortion calibration model.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
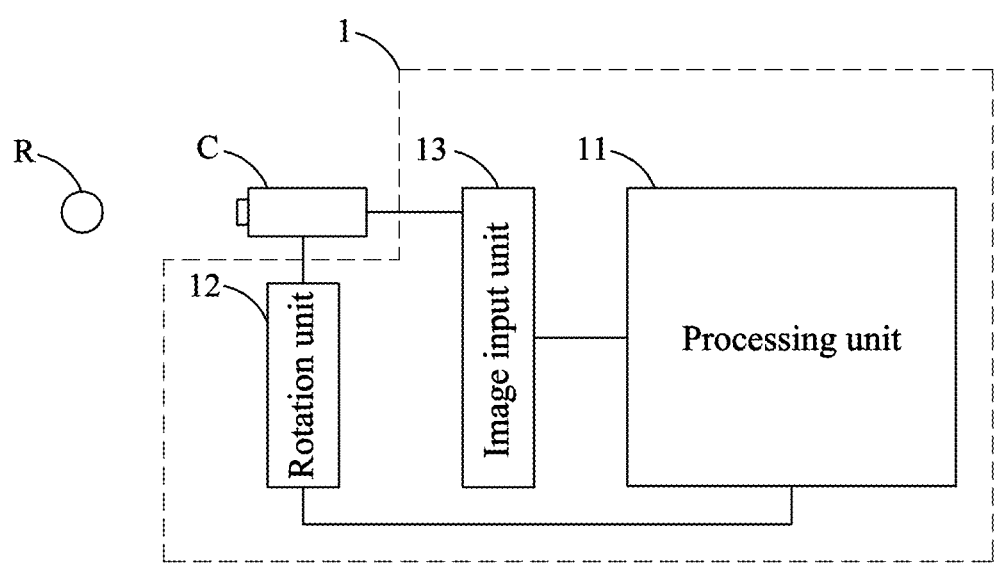
FIG. 1 is a schematic view of a wide-angle lens calibration system of the first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIG. 1 for a schematic view of a wide-angle lens calibration system of the first embodiment of the present disclosure. As shown in FIG. 1, the wide-angle lens calibration system 1 may include a rotation unit 12, an image input unit 13 and a processing unit 11.

The rotation unit 12 may mount a lens to be calibrated C, and the rotation direction of the rotation unit 12 may be parallel to the horizontal direction, and the optical axis center of the lens C may be aligned with a reference object R. The image input unit 13 may receive the image from the lens C, and transmit the image to the processing unit 11. The processing unit 11 may control the rotation unit 12 to rotate and analyze the image of the lens C; the rotation direction of the rotation unit 12 may be parallel to the horizontal direction.

First, the processing unit 11 may execute a distortion calibration process to establish a distortion calibration model, which can calibrate the image distortion of the lens C. When the processing unit 11 executes the distortion calibration process, the processing unit 11 may control the rotation unit 12 to continuously rotate by a first predetermined angle and along the rotation direction, and record the distance between the position of the reference object R in the image and the optical axis center, and the total rotation angle after each rotation until the reference object is out of the observation range of the lens C so as to establish a distortion calibration model.

Next, the processing unit 11 may execute an axial ratio calibration process, which can recover the real geometric shape of the object in the image. When the processing unit 11 executes the axial ratio calibration process, the processing unit 11 may provide a predetermined value as the axial ratio of the short axis to the long axis of the lens C; then, the processing unit 11 may calibrate the axial ratio of the short axis to the long axis of the image of the lens C to generate a first calibrated image; the image may have at least two feature points and the feature points may have a given geometric shape in the physical space; for example, the connection line of the two feature points is a vertical line (i.e. the two feature points have the same x-coordinate); or the three feature points form a regular triangle or other geometric shapes.

After the first calibrated image is obtained, the processing unit 11 may further calibrate the first calibrated image according to the distortion calibration model to generate a second calibrated image. Finally, the processing unit 11 may determine whether the feature points in the second calibrated image conform to their geometric shape in the physical space; if the feature points in the second calibrated image fail to conform to their geometric shape in the physical space, the processing may adjust the predetermine value and repeat the above steps until the feature points conform to their geometric shape in the physical space; then, the calibration process is finished.

Besides, if the optical axis center of the lens C is not given, the processing unit 11 may execute the optical axis center calibration process to calculate the optical axis center of the lens C. When the processing unit 11 execute the optical axis center calibration process, the processing unit 11 may provide a predetermined optical axis center, and align the predetermined optical axis center with the reference object R; afterward, the processing unit 11 may rotate the rotation unit 12 by a second predetermined angel and along the two sides of the horizontal direction respectively to generate a first symmetric calibration parameter; then, the processing unit 11 may calculate the vertical symmetric axis of the lens C according to the first symmetric calibration parameter.

The processing unit 11 may further calculate a first intersection point according to the perpendicular bisector of the connection line of two feature points of the image of the lens C and the perpendicular bisector of the connection line of the other two feature points of the image of the lens C; next, the processing unit 11 may rotate the lens C to change the positions of the feature points along the horizontal direction, and then calculate a second intersection point according to the perpendicular bisector of the connection line of two feature points of the image and the perpendicular bisector of the connection line of the other two feature points of the image. In this way, the processing unit 11 may calculate the horizontal symmetric axis of the lens C according to the first intersection point and the second intersection point, and then calculate the optical axis center of the lens C according to the vertical symmetric axis and the horizontal symmetric axis.

As described above, the wide-angle lens calibration system can execute the optical axis center calibration, the distortion calibration and the axial ratio calibration by the rotation unit and simple math model without any special device, complicated math model and high-precision image processing technology; therefore, the wide-angle lens calibration system according to the embodiment of the disclosure is not only of higher precision, but also is of lower cost.

Figure 2:
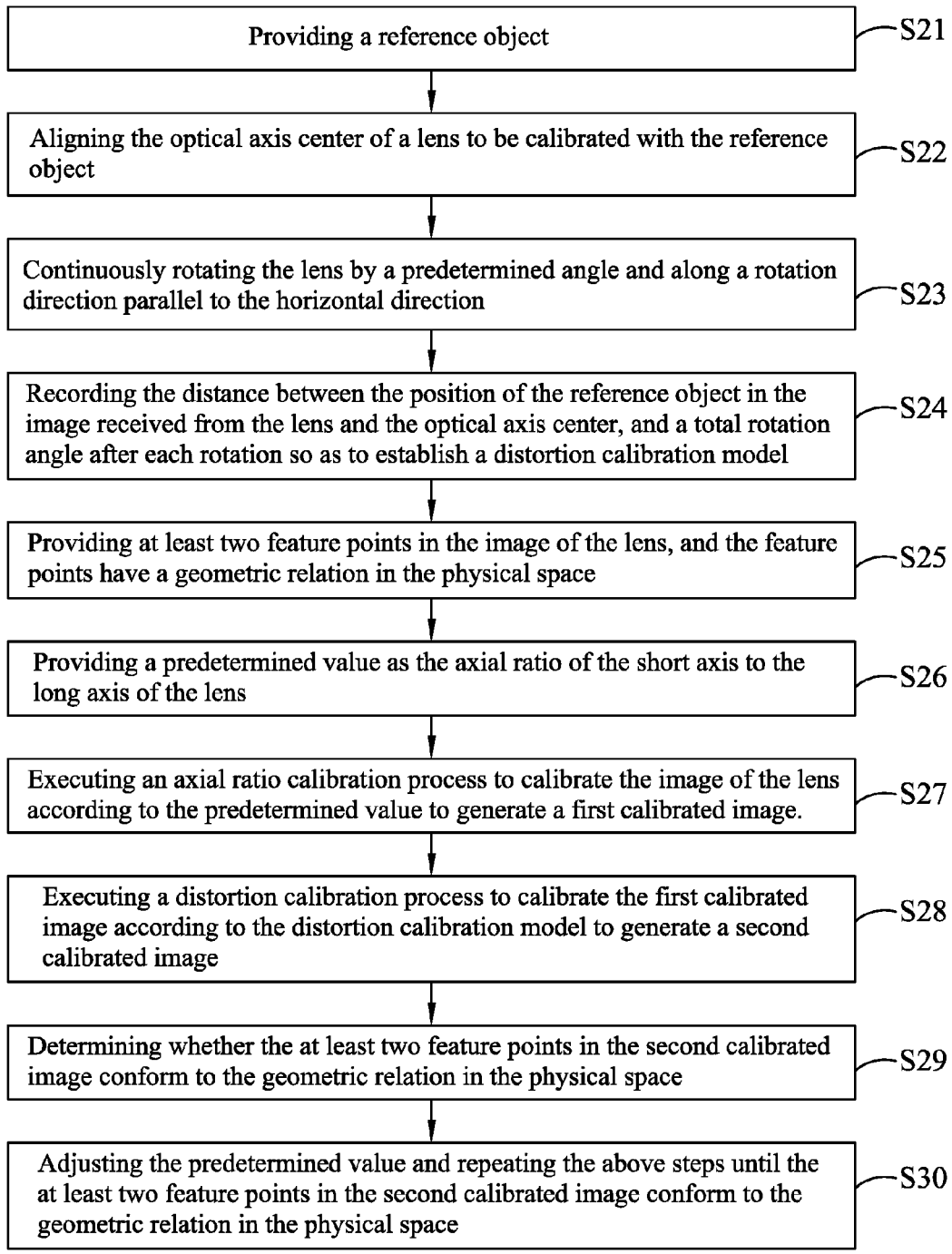
FIG. 2 is a flow chart of a wide-angle lens calibration system of the first embodiment of the present disclosure.

With reference to FIG. 2 for a flow chart of a wide-angle lens calibration system of the first embodiment of the present disclosure. The embodiment may include the following steps:

In the step S21: Providing a reference object.

In the step S22: Aligning the optical axis center of a lens to be calibrated with the reference object.

In the step S23: Continuously rotating the lens by a predetermined angle and along a rotation direction parallel to the horizontal direction.

In the step S24: Recording the distance between the position of the reference object in the image received from the lens and the optical axis center, and the total rotation angle after each rotation so as to establish a distortion calibration model.

The embodiment may further include the following steps:

In the step S25: Providing at least two feature points in the image of the lens, and the feature points have a geometric relation in the physical space.

In the step S26: Providing a predetermined value as the axial ratio of the short axis to the long axis of the lens.

In the step S27: Executing an axial ratio calibration process to calibrate the image of the lens according to the predetermined value to generate a first calibrated image.

In the step S28: Executing a distortion calibration process to calibrate the first calibrated image according to the distortion calibration model to generate a second calibrated image.

In the step S29: Determining whether the at least two feature points in the second calibrated image conform to the geometric relation in the physical space.

In the step S30: Adjusting the predetermined value and repeating the above steps until the at least two feature points in the second calibrated image conform to the geometric relation in the physical space.

However, in the above embodiment, the order of the steps is just for example instead of limitation; the order of the steps can be changed according to the requirements and the present disclose will not be limited thereby.

It is worthy to point out that a conventional wide-angle lens calibration system cannot effectively calibrate the image distortion of the wide-angle lens; therefore, the conventional wide-angle lens calibration cannot achieve high performance. On the contrary, according to one embodiment of the present disclosure, the wide-angle lens calibration system can execute the distortion calibration process to effectively calibrate the image distortion of the wide-angle lens; therefore, the wide-angle lens calibration system can achieve better performance.

Also, according to one embodiment of the present disclosure, the wide-angle lens calibration system can further execute the optical axis center calibration process to find out the optical axis center of the lens; therefore, the function of the wide-angle lens calibration system is more powerful.

Figure 3:
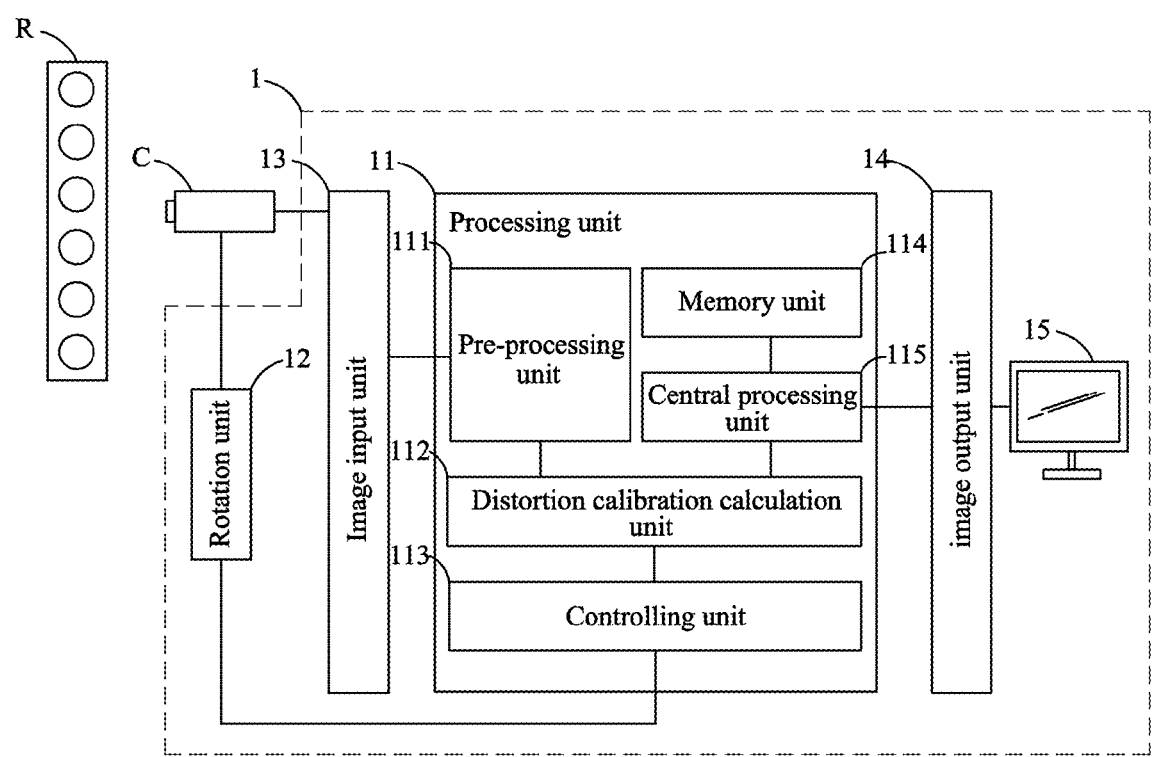
FIG. 3 is a schematic view of a wide-angle lens calibration system of the second embodiment of the present disclosure.

With reference to FIG. 3 for a schematic view of a wide-angle lens calibration system of the second embodiment of the present disclosure. As shown in FIG. 3, the wide-angle lens calibration system 1 may include a rotation unit 12, an image input unit 13, an image output unit 14, a processing unit 11 and a display unit 15.

The rotation unit 12 may mount the lens to be calibrated C, and the rotation direction of the rotation unit 12 may be parallel to the rotation direction; the optical axis center of the lens C may align with the reference object R; more specifically, the rotation unit 12 may include a multi-axis rotation mechanism and a cradle head; the reference object R may an object which serves as a feature point and can be identified by the processing unit 11; the reference object R may be used for measurement and alignment, such as several objects formed into a line, a checkerboard pattern or other different patterns with different geometric shapes. The image input unit 13 may receive the image form the lens C and transmit the image to the processing unit 11.

The processing unit 11 may control the rotation unit 12 to rotate and analyze the image of the lens C so as to execute various calibration processes and generate the calibration results. More specifically, the processing unit 11 may include a pre-processing unit 111, a distortion calibration calculation unit 112, a control unit 113, a memory unit 114 and a central processing unit 115. The pre-processing unit 111 may execute the contour enhancement and the color gain for the image received from the lens, which can achieve the denoising effect and enhance the image features. The distortion calibration calculation unit 112 may execute various calculation processes, receive the feature information of the image and control the rotation angle of the rotation unit 12 to generate the calibration model. The central processing unit 115 may execute the chip initialization process, image pre-processing process, distortion calibration calculation process, drawing process, logic judgment process, etc. The memory unit 114 may serve as a data buffer. The control unit 113 may control the rotation unit 12 to rotate.

The image output unit 14 may receive the calibration result from the processing unit 11 and transmit the calibration result to the display unit 15; the display unit 15 may show the calibration result.

Figure 4:
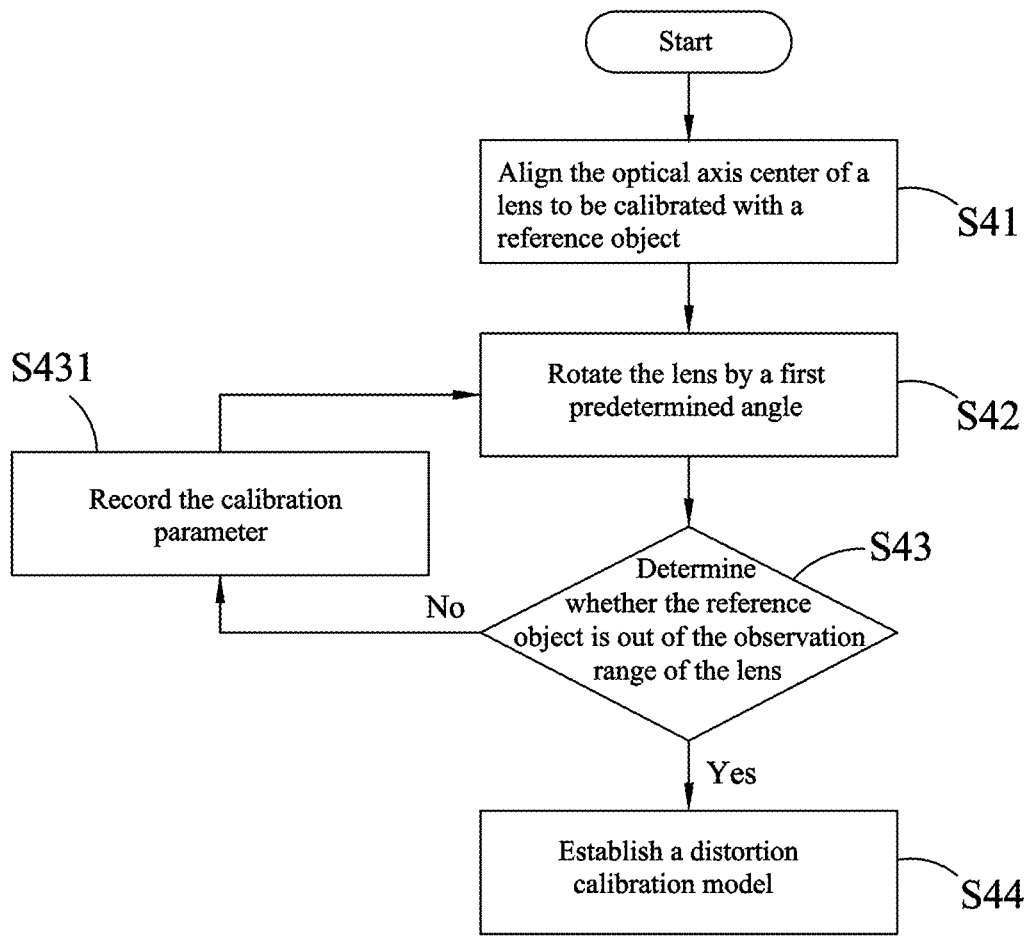
FIG. 4 is a first flow chart of a wide-angle lens calibration system of the second embodiment of the present disclosure.

With reference to FIG. 4 for a first flow chart of a wide-angle lens calibration system of the second embodiment of the present disclosure. FIG. 4 illustrates the detailed flow of the distortion calibration process executed by the wide-angle lens calibration system.

The processing unit 11 may execute the distortion calibration process to create the distortion calibration model, which can be used to calibrate the image distortion of the lens to be calibrated C. When the processing unit 11 executes the distortion calibration process, the processing unit 11 may control the rotation unit 12 to rotate so as to align the optical axis center of the lens C with the reference object R. The processing unit 11 may control the rotation unit 12 to rotate by a first predetermined angle $\alpha°$ (for example, 5°) and along the rotation direction to record the current total rotation angle and the distance between the position of the reference object R in the image and the optical axis center for serving as the calibration parameters; the processing unit 11 may keep repeating the above steps until the reference object R is out of the observation range of the lens C; in this way, the processing unit 11 may create a distortion calibration model according to the calibration parameters obtained from the above steps. Via the above process, the relations between the incident angle of the incident light and the refraction angle of the lens imaging can be accurately calculated so as to further calculate the relations between the positions of the pixels before and after the calibration, and then execute the image distortion calibration.

After the distortion calibration process ends, the processing unit 11 may obtain the calibration parameters, including the rotation angle $\{0° \ \alpha° \ 2\alpha° \ \ldots \ n\alpha°\}$ and the distances between the position of the reference object R in the image and the optical axis center $\{d_0 \ d_1 \ d_2 \ \ldots \ d_n\}$ so as to create the distortion calibration model. In this way, the processing unit 11 may obtain a corresponding rotation angle according to a given length and the distortion calibration model, and then further obtain the length corresponding to the rotation angle after the distortion calibration.

The distortion calibration process of the embodiment may include the following steps:

In the step S41: Align the optical axis center of a lens to be calibrated with a reference object. Then, the process proceeds to the step S42.

In the step S42: Rotate the lens by a first predetermined angle. Then, the process proceeds to the step S43.

In the step S43: Determine whether the reference object is out of the observation range of the lens? If it is, the process proceeds to the step S44; if it is not, the process proceeds to the step S431.

In the step S431: Record the calibration parameter. The process returns to the step S42.

In the step S44: Establish a distortion calibration model.

However, in the above embodiment, the order of the steps is just for example instead of limitation; the order of the steps can be changed according to the requirements and the present disclose will not be limited thereby.

Figure 5:
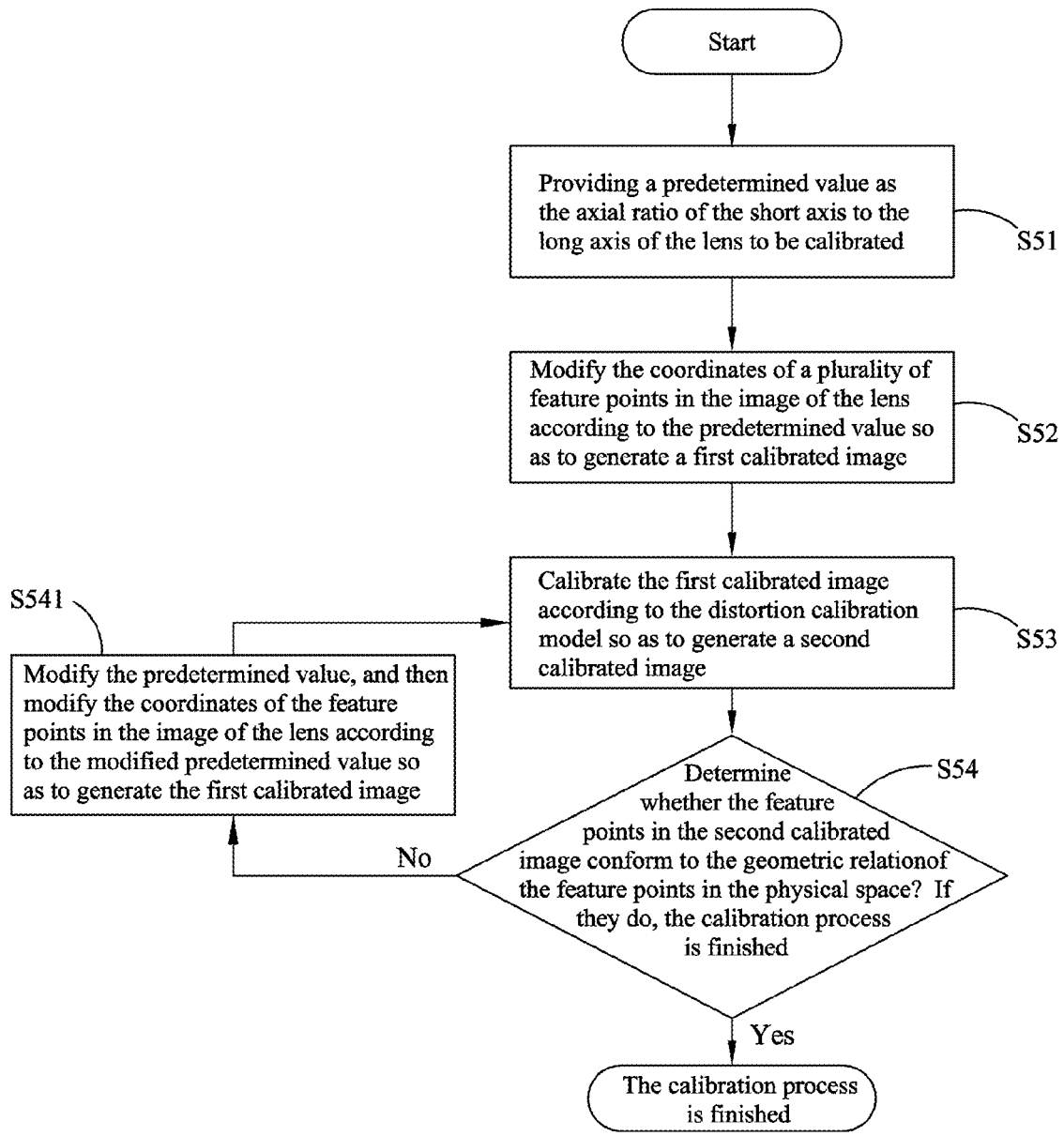
FIG. 5 is a second flow chart of a wide-angle lens calibration system of the second embodiment of the present disclosure.

With reference to FIG. 5 for a second flow chart of a wide-angle lens calibration system of the second embodiment of the present disclosure. FIG. 5 illustrates the detailed flow of the axial ratio calibration process executed by the wide-angle lens calibration system.

Due to the design of the photosensitive element of the lens C, its horizontal axis and vertical axis have various ratios; therefore, the axial ratio of the horizontal axis to the vertical axis of an object in the image will be incorrect; thus, the shape of the object in the image will be different from that of the object in the physical space; by means of modifying the axial ratio, the axial ratio of the horizontal axis to the vertical axis of an object in the image will be correct; then, the distortion of the image can be calibrated by using the distortion calibration model.

The processing unit 11 may execute the axial ratio calibration process to recover the real geometric shape of the object in the image. When the processing unit 11 executes the axial ratio calibration process, the processing unit 11 may provide a predetermined value as the axial ratio of the lens to be calibrated C; next, the processing unit 11 may calibrate the axial ratio of the image of the lens C according to the predetermined value so as to generate a first calibrated image; the image may have at least two feature points and the feature points may have a given geometric shape in the physical space.

For instance, there are two feature points p1=(x1, y1) and $p_1=(x_1,y_1)$p2=(x2, y2) in the image of the lens to be calibrated C, and the feature point p1 and the feature point p2 have the same x-coordinate. Then, the processing unit 11 may provide a predetermined value K as the predetermined axial ratio, and then calibrate the feature point p1 and the feature point p2 according to the predetermined value K to generate a first calibrated image; the feature point p1 calibrated by the predetermined value K is P1=(Kx1, y1); the feature point p2 calibrated by the predetermined value K is P2=(Kx2, y2).

After the first calibrated image is obtained, the processing unit 11 may further calibrate the first calibrated image according to the distortion calibration model to generate a second calibrated image. More specifically, the processing unit 11 may calculate the length between P1 and the optical axis center and the length between P2 and the optical axis center; the length between P1 and the optical axis center is ScrD1 and the length between P2 and the optical axis center is ScrD2. Afterward, the processing unit 11 may compare the calibration parameters of the distortion calibration model with the length ScrD1 and the length ScrD2 so as to obtain the extended length UndisD1 and UndisD2 after the distortion calibration; thus, the processing unit 11 may calibrate the feature point P1 and the feature point P2 via the above parameters to generate a second calibrated image; after the axial ratio calibration process and the distortion calibration process, the coordinate of the feature point p1 is $p_1 = (Kx_1 \times UndiskD_1/ScrD_1, y_1 \times UndiskD_1/ScrD_1)$ and the coordinate of the feature point p2 is $p'_2 = (Kx_2 \times UndiskD_2/ScrD_2, y_2 \times UndiskD_2/ScrD_2)$.

It is known that the feature point p1 and the feature point p2 have the same x-coordinate in the physical space; therefore, if the predetermined value K is correct, the feature point $p'_1$ and the feature point $p'_2$ in the second calibrated image must have the same x-coordinate, too. Therefore, the processing unit 11 may determine whether the x-coordinate of the feature point $p'_1$ is equal to that of the feature point $p'_2$; if x-coordinate of the feature point $p'_1$ is not equal to that of the feature point $p'_2$, the processing unit 11 may adjust the predetermined value K and then repeat the above steps until the x-coordinate of the feature point $p'_1$ is equal to that of the feature point $p'_2$; at this time, the processing unit 11 can determine that the predetermined value K is correct, and then the calibration process is finished.

The axial ratio calibration process of the embodiment may include the following steps:

In the step S51: Providing a predetermined value as the axial ratio of the short axis to the long axis of the lens to be calibrated. Then, the process proceeds to the step S52.

In the step S52: Modify the coordinates of a plurality of feature points in the image of the lens according to the predetermined value so as to generate a first calibrated image. Then, the process proceeds to the step S53.

In the step S53: Calibrate the first calibrated image according to the distortion calibration model so as to generate a second calibrated image. Then, the process proceeds to the step S54.

In the step S54: Determine whether the feature points in the second calibrated image conform to the geometric relation of the feature points in the physical space? If they do, the calibration process is finished; if they do not, the process proceeds to the step S541.

In the step S541: Modify the predetermined value, and then modify the coordinates of the feature points in the image of the lens according to the modified predetermined value so as to generate the first calibrated image. Then, the process returns to the steps S53.

However, in the above embodiment, the order of the steps is just for example instead of limitation; the order of the steps can be changed according to the requirements and the present disclose will not be limited thereby.

Figure 6:
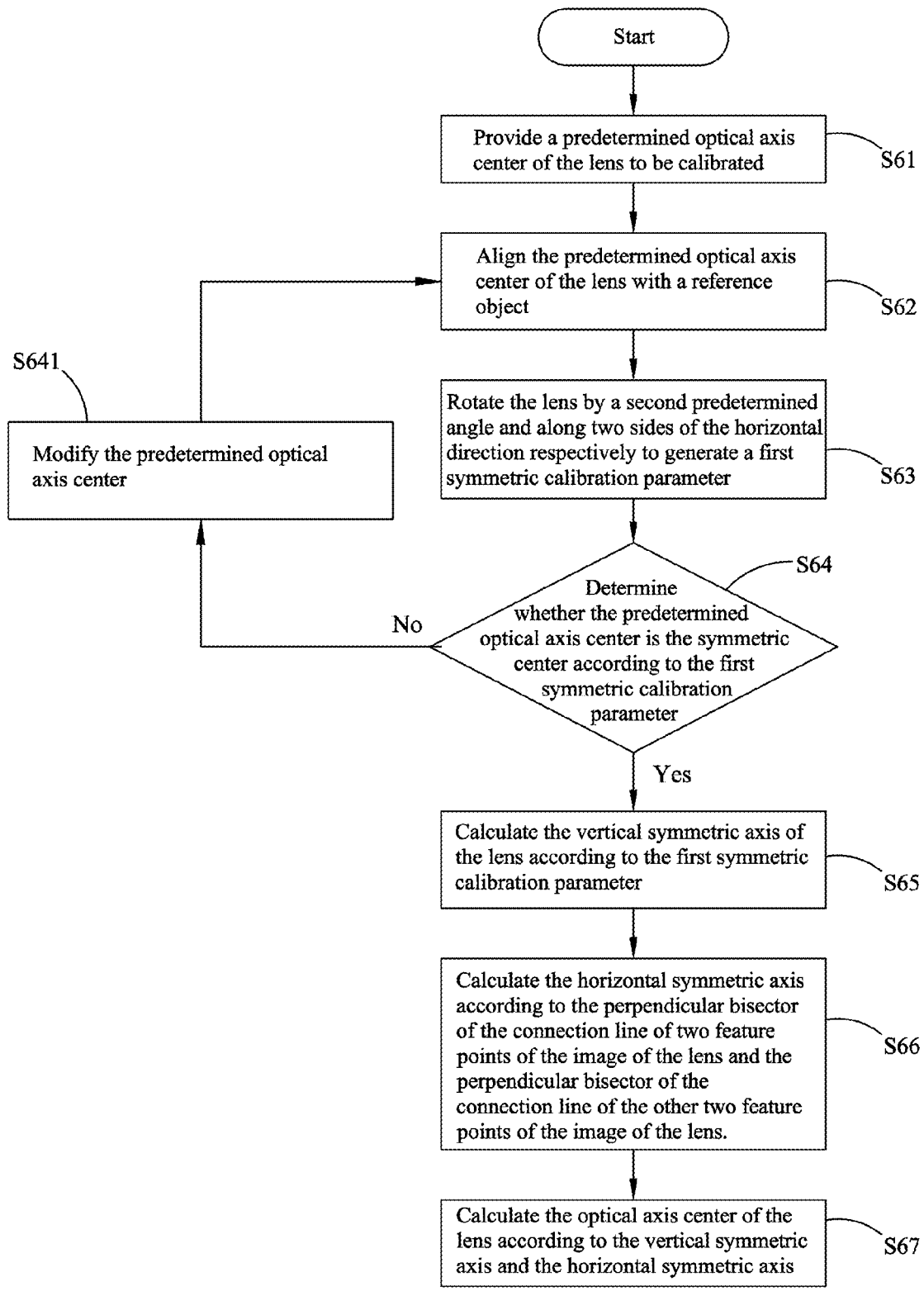
FIG. 6 is a third flow chart of a wide-angle lens calibration system of the second embodiment of the present disclosure.

With reference to FIG. 6 for a third flow chart of a wide-angle lens calibration system of the second embodiment of the present disclosure. FIG. 6 illustrates the detailed flow of the optical axis center calibration process executed by the wide-angle lens calibration system.

If the optical axis center of the lens to be calibrated C is unknown, the processing unit 11 may execute an optical axis center calibration process to calibrate the optical axis center of the lens C. When the processing unit 11 executes the optical axis center calibration process, the process unit 11 may provide a predetermined axis center and align the predetermined optical axis center with the reference object R; at this time, the processing unit 11 may provide a second predetermined angle θ° and control the rotation unit 12 to rotate by +θ° and −θ° respectively along the horizontal direction; then, the processing unit 11 may calculate the distance D1 between the position of the reference object R in the image and the optical axis center after the rotation unit 12 is rotated by +θ°, and calculate the distance D2 between the position of the reference object R in the image and the optical axis center after the rotation unit 12 is rotated by −θ°, which may serve as a first calibration parameter. Afterward, the processing unit 11 may determine whether the distance D1 is equal to the distance D2 or not; if the distance D1 is not equal to the distance D2, the processing unit 11 can adjust the predetermined optical axis center and then repeat the above steps until the distance D1 is equal to the distance D2; then, the vertical symmetric axis of the lens C can be obtained.

The processing unit 11 may calculate a first intersection point according to the perpendicular bisector of the connection line of two feature points of the image of the lens C and the perpendicular bisector of the connection line of the other two feature points of the image of the lens C; next, the processing unit 11 may rotate the lens C along the horizontal direction, and horizontally move the feature points along the horizontal direction to change the positions of the feature points; afterward, the processing unit 11 may further calculate a second intersection point according to the perpendicular bisector of the connection line of two feature points of the image of the lens C and the perpendicular bisector of the connection line of the other two feature points of the image of the lens C (the above steps may be achieved by only three feature points; for example, the processing unit 11 may calculate the perpendicular bisector of the connection line of the feature point "a" and the feature point "b", and then calculate the perpendicular bisector of the connection line of the feature point "b" and the feature point "c"). In this way, the processing unit may calculate the horizontal symmetric axis of the lens C according to the first intersection point and the second intersection point, and then calculate the optical axis center of the lens C according to the vertical symmetric axis and the horizontal symmetric axis.

In another embodiment, after the vertical symmetric axis of the lens C is obtained, the processing unit 11 may provide a third predetermined angle β° to control the rotation unit 12 to rotate by +β° and −β° respectively along the vertical direction (after the vertical symmetric axis is obtained, the vertical symmetric axis can serve as the vertical direction.), and the use the same method to calculate the horizontal symmetric axis of the lens C so as to obtain the optical axis center of the lens C. However, in the above embodiment, the order of the steps is just for example instead of limitation; the order of the steps can be changed according to the requirements and the present disclose will not be limited thereby.

The optical axis center calibration process of the embodiment may include the following steps:

In the step S61: Provide a predetermined optical axis center of the lens to be calibrated. Then, the process proceeds to the step S62.

In the step S62: Align the predetermined optical axis center of the lens with a reference object. Then, the process proceeds to the step S63.

In the step S63: Rotate the lens by a second predetermined angle and along two sides of the horizontal direction respectively to generate a first symmetric calibration parameter. Then, the process proceeds to the step S64.

In the step S64: Determine whether the predetermined optical axis center is the symmetric center according to the first symmetric calibration parameter? If it is, the process proceeds to the step S65; if it is not, the process proceeds to the step S641.

In the step S641: Modify the predetermined optical axis center. Then, the process returns to the step S62.

In the step S65: Calculate the vertical symmetric axis of the lens according to the first symmetric calibration parameter. Then, the process returns to the step S66.

In the step S66: Calculate the horizontal symmetric axis according to the perpendicular bisector of the connection line of two feature points of the image of the lens and the perpendicular bisector of the connection line of the other two feature points of the image of the lens. Then, the process returns to the step S67.

In the step S67: Calculate the optical axis center of the lens according to the vertical symmetric axis and the horizontal symmetric axis.

However, in the above embodiment, the order of the steps is just for example instead of limitation; the order of the steps can be changed according to the requirements and the present disclose will not be limited thereby.

It is worthy to point out that a conventional wide-angle lens calibration system needs a special device, complicated math model or high-precision image processing technology to calibrate a wide-angle lens, which significantly increase its cost. On the contrary, according to the embodiment of the disclosure, the wide-angle lens calibration system can execute the image distortion calibration just by rotating the rotation unit to obtain the calibration parameters, and then execute the axial ratio calibration by simple math model without any special device, complicated math model and high-precision image processing technology; thus, the precision of the wide-angle lens calibration system can be higher and the cost of the wide-angle lens calibration can be significantly reduced.

Also, according to the embodiment of the disclosure, the wide-angle lens calibration system can accurately calculate the optical axis center of the wide-angle lens by similar method; therefore, the cost of the wide-angle lens calibration system can be further reduced. As described above, the present disclosure definitely has an inventive step.

Figure 7:
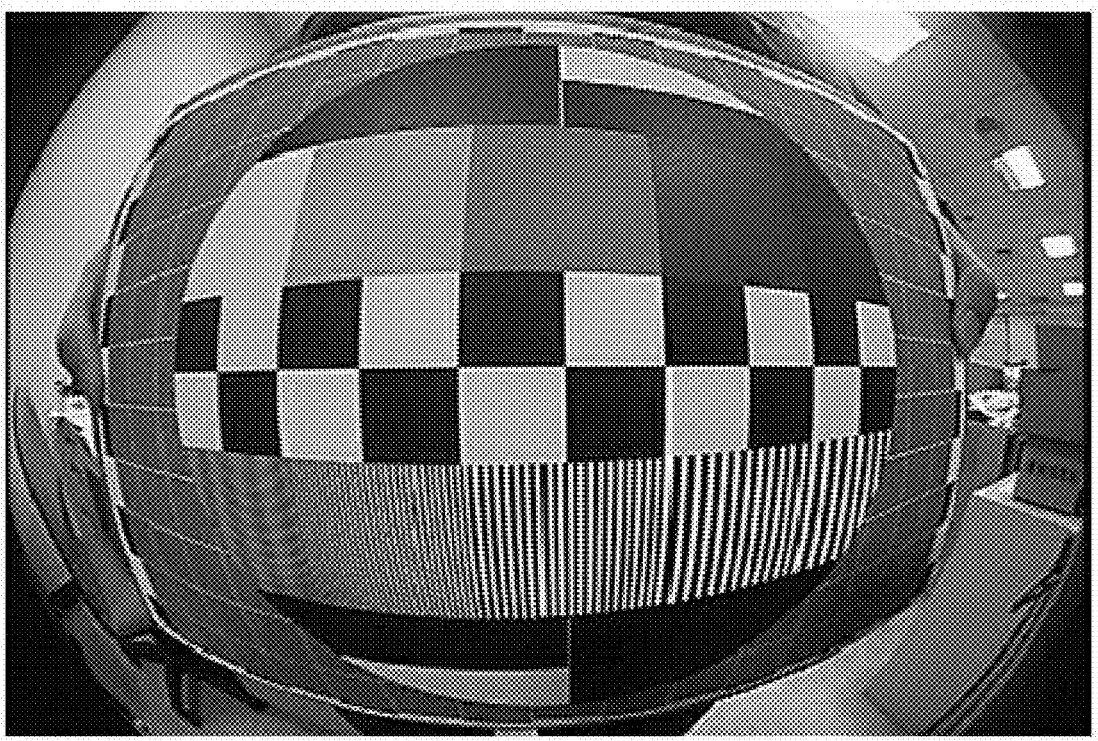
FIG. 7 is a first schematic view of a wide-angle lens calibration system of the third embodiment of the present disclosure.
Figure 8:
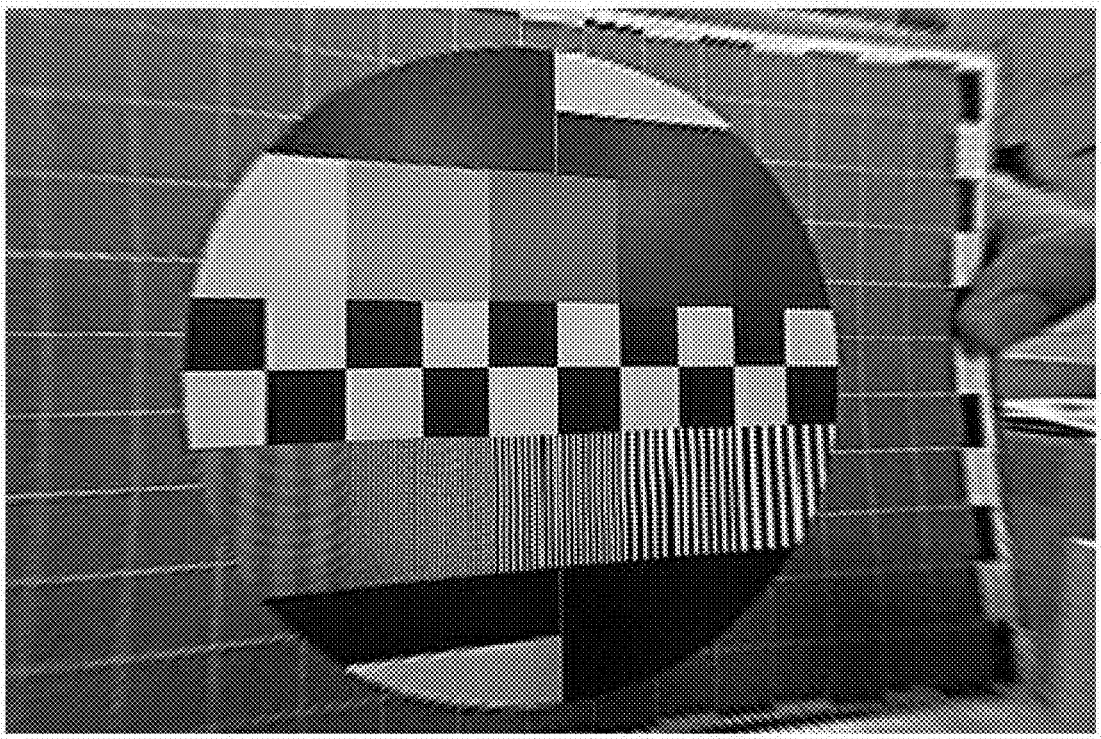
FIG. 8 is a second schematic view of a wide-angle lens calibration system of the third embodiment of the present disclosure.

With reference to FIG. 7 and FIG. 8 for a first schematic view and a second schematic view of a wide-angle lens calibration system of the third embodiment of the present disclosure. The embodiment illustrates the usage situation of the wide-angle lens calibration system. FIG. 7 shows the image before calibrated by the wide-angle lens calibration system according to the embodiment of the disclosure, and FIG. 8 shows the image after calibrated by the wide-angle lens calibration according to the embodiment of the disclosure.

As shown in FIG. 7, before the image is calibrated by the wide-angel lens calibration system, the image is seriously distorted and deformed; on the contrary, as shown in FIG. 8, after the image is calibrated by the wide-angle lens calibration system, the distortion and deformation of the image is significantly improved.

In summation of the description above, the wide-angle lens calibration system and the method thereof according to the exemplary embodiments of the present disclosure may have the following advantages:

(1) According to one embodiment of the present disclosure, the wide-angle calibration system can execute the distortion calibration process to effectively calibrate the image distortion of the wide-angle lens; therefore, the wide-angle calibration system can achieve better performance.

(2) According to one embodiment of the present disclosure, the wide-angle lens calibration system can not only execute the distortion calibration process to calibrate the image distortion of the wide-angle lens, but also can execute the axial ratio calibration process to calibrate the image deformation resulting from the wide-angle lens so as to recover the real geometric shape of the object in the image; thus, the performance of the wide-angle calibration system can be further improved.

(3) According to one embodiment of the present disclosure, the wide-angle lens calibration system can further execute the optical axis center calibration process to find out the optical axis center of the wide-angle lens; for the reason, the function of the wide-angle lens calibration system is more powerful.

(4) According to one embodiment of the present disclosure, the wide-angle lens calibration system can rotate the rotation unit to find out the relations between the incident angle of the incident light and the refraction angle of the lens imaging so as to further calculate the relations between the positions of the pixels before and after the calibration, and then execute the image distortion calibration without any special device, complicated math model and high-precision image processing technology; afterward, the wide-angle lens calibration system can further execute the axial ratio calibration process by simple math calculation; thus, the precision of the wide-angle lens calibration system can be higher and the cost of the wide-angle lens calibration can be significantly reduced.

(5) According to one embodiment of the present disclosure, the wide-angle lens calibration system can accurately calculate the optical axis center only by rotating the rotation unit to obtain the symmetric calibration parameters to calculate the vertical symmetric axis of the wide-angle lens and then calculating the horizontal symmetric axis of the wide-angle lens by a simple math model without any special device, complicated math model and high-precision image processing technology; therefore, the cost of the wide-angle lens calibration system can be further reduced.

(6) According to one embodiment of the present disclosure, the wide-angle lens calibration system can rotate the rotation unit to find out the relations between the incident angle of the incident light and the refraction angle of the lens imaging so as to further calculate the relations between the positions of the pixels before and after the calibration, so the wide-angle lens calibration system is applicable to the wide-angle lenses with vignetting effect; thus, the wide-angle lens calibration system is more comprehensive in use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wide-angle lens calibration system, comprising:
a rotation unit, comprising a rotation mechanism with single axis or multiple axes and arranged to mount a lens to be calibrated, a rotation direction of the rotation unit being parallel to a horizontal direction, and an optical axis center of the lens being aligned with a reference object; and a processing unit, comprising a central processing unit and configured to control the rotation unit to rotate via the rotation mechanism, receive an image from the lens and analyze the image;

wherein the processing unit executes a distortion calibration process to continuously rotate the rotation unit by a predetermined angle via the rotation mechanism and record a distance between a position of the reference object in the image and the optical axis center, and a total rotation angle after each rotation so as to establish a distortion calibration model.

2. The wide-angle lens calibration system of claim 1, wherein the processing unit comprises a pre-processing unit configured to execute a contour enhancement and a color gain for the image received from the lens.

3. The wide-angle lens calibration system of claim 1, wherein the processing unit comprises a distortion calibration calculation unit configured to receive a feature information of the image received from the lens, execute a calculation process of the distortion calibration process and control a rotation angle of the rotation unit so as to generate the distortion calibration model.

4. The wide-angle lens calibration system of claim 1, wherein the central processing unit is configured to execute a chip initialization process, an image pre-processing process, a distortion calibration calculation process, a drawing process and a logic judgment process.

5. The wide-angle lens calibration system of claim 1, wherein the processing unit comprises a control unit configured to control the rotation unit to rotate.

6. The wide-angle lens calibration system of claim 1, wherein the processing unit comprises a memory unit serving as a data buffer.

7. A wide-angle lens calibration method, comprising the following steps:
providing a reference object;
aligning an optical axis center of a lens to be calibrated with the reference object;
continuously rotating the lens via a rotation mechanism with single axis or multiple axes by a first predetermined angle and along a rotation direction parallel to a horizontal direction; and
recording a distance between a position of the reference object in an image received from the lens and the optical axis center, and a total rotation angle after each rotation by a central processing unit so as to establish a distortion calibration model.

8. The wide-angle lens calibration method of claim 7, further comprising the following step:
continuously rotating the lens by the predetermined angle and the rotation direction until the reference object is out of an observation range of the lens.

9. The wide-angle lens calibration method of claim 7, further comprising the following step:
providing at least two feature points in the image, wherein the feature points have a geometric relation in a physical space;
providing a predetermined value as an axial ratio of a short axis to a long axis of the lens;
executing an axial ratio calibration process to calibrate the image according to the predetermined value to generate a first calibrated image;
executing a distortion calibration process to calibrate the first calibrated image according to the distortion calibration model to generate a second calibrated image; and determining whether the at least two feature points in the second calibrated image conform to the geometric relation in the physical space.

10. The wide-angle lens calibration method of claim 9, further comprising the following step:
repeatedly adjusting the predetermined value until the at least two feature points in the second calibrated image conform to the geometric relation in the physical space.

11. The wide-angle lens calibration method of claim 7, further comprising the following step:
aligning a predetermined optical axis center of the lens with the reference object and rotating the lens by a second predetermined angle and along two sides of the horizontal direction respectively to generate a first symmetric calibration parameter;
calculating a vertical symmetric axis of the lens according to the first symmetric calibration parameter;
rotating the lens by a third predetermined angle and along two sides of a vertical direction respectively to generate a second symmetric calibration parameter;
calculating a horizontal symmetric axis of the lens according to the second symmetric calibration parameter; and
calculating the optical axis center according to the vertical symmetric axis and the horizontal symmetric axis.

12. The wide-angle lens calibration method of claim 11, further comprising the following step:
calculating a first distance between the position of the reference object in the image and the optical axis center after the lens is rotated along one side of the horizontal direction, and calculating a second distance between the position of the reference object in the image and the optical axis center after the lens is rotated along the other side of the horizontal direction so as to obtain the first symmetric calibration parameter; and
determining whether the first distance is equal to the second distance; if the first distance is not equal to the second distance, adjusting the predetermined optical axis center and repeating the above steps until the first distance is equal to the second distance so as to obtain the vertical symmetric axis.

13. The wide-angle lens calibration method of claim 7, further comprising the following step:
aligning a predetermined optical axis center of the lens with the reference object and rotating the lens by a second predetermined angle and along two sides of the horizontal direction respectively to generate a first symmetric calibration parameter;
calculating a vertical symmetric axis of the lens according to the first symmetric calibration parameter;
calculating a first intersection point according to a perpendicular bisector of a connection line of two feature points of the image and a perpendicular bisector of a connection line of the other two feature points of the image;
changing positions of the feature points along the horizontal direction, and calculating a second intersection point according to the perpendicular bisector of the connection line of two feature points of the image and the perpendicular bisector of the connection line of the other two feature points of the image;
calculating a horizontal symmetric axis of the lens according to the first intersection point and the second intersection point; and
calculating the optical axis center according to the horizontal symmetric axis and the vertical symmetric axis.

14. The wide-angle lens calibration method of claim 13, further comprising the following step:

calculating a first distance between the position of the reference object in the image and the optical axis center after the lens is rotated along one side of the horizontal direction;

calculating a second distance between the position of the reference object in the image and the optical axis center after the lens is rotated along the other side of the horizontal direction so as to obtain the first symmetric calibration parameter; and determining whether the first distance is equal to the second distance; if the first distance is not equal to the second distance, adjusting the predetermined optical axis center and repeating the above steps until the first distance is equal to the second distance so as to obtain the vertical symmetric axis.

* * * * *